Oct. 17, 1944.  C. A. LAPP  2,360,427
PRESSED METAL PIPE FITTING
Filed Feb. 27, 1943
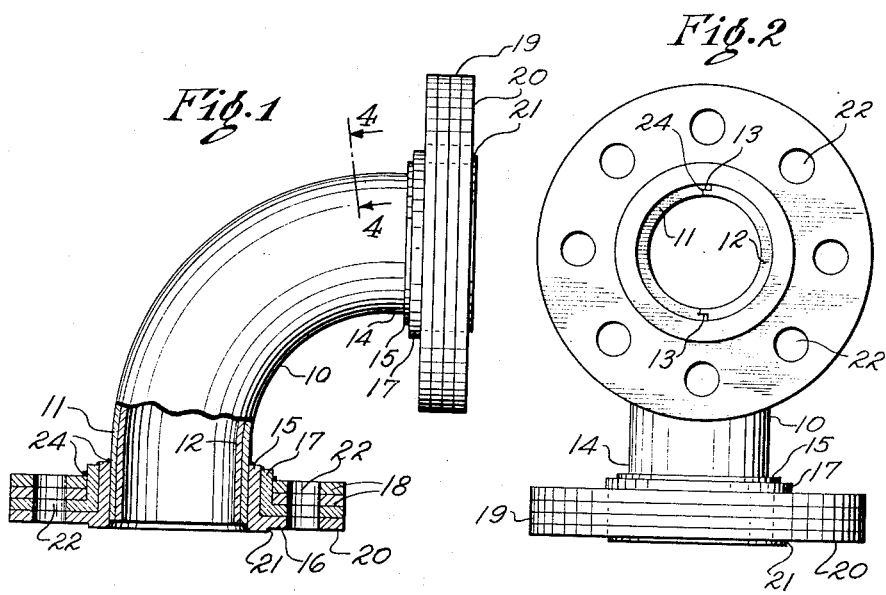
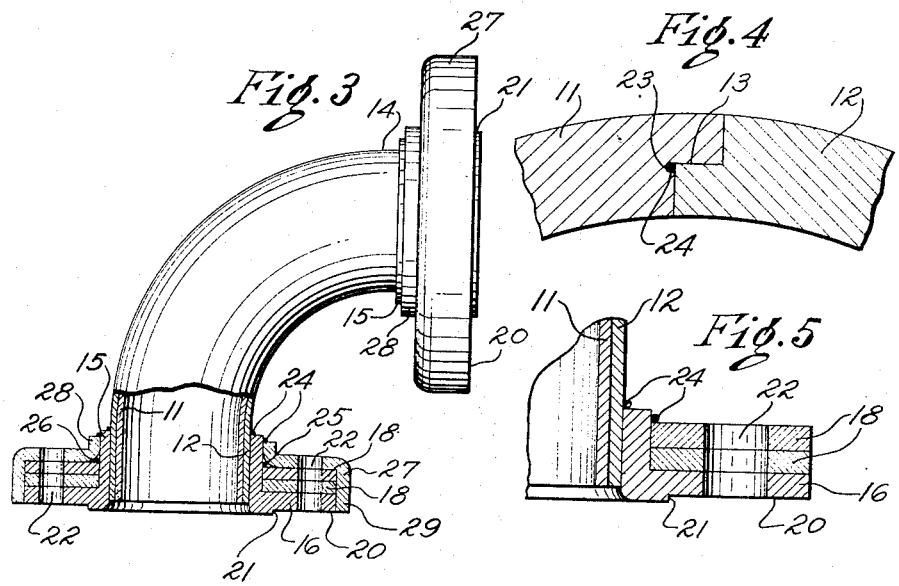
INVENTOR.
CHESTER A. LAPP
BY Richey & Watts
ATTORNEYS Patented Oct. 17, 1944

2,360,427

UNITED STATES PATENT OFFICE 2,360,427

PRESSED METAL PIPE FITTING

Chester A. Lapp, Cleveland, Ohio, assignor of one-half to William R. McDonough, Cleveland, Ohio Application February 27, 1943, Serial No. 477,336

7 Claims. (Cl. 285—211)

This invention relates broadly to pipe fittings and more specifically to improvements in the design and organization of a complement of pressed metal parts for the construction of elbows, T's and similar couplings.

One of the objects of the invention is to construct a companion flange embodying a plate and a plurality of similar fabricated stampings which are united in bonded relation with each other and with the plate to form a lamellar flange.

Another object of the invention is to construct the body or conduit portion of the pipe fitting from two or more stampings having ledges in the longitudinal edges thereof which are formed for interlocked lateral securement of the parts and configured to facilitate the assembly of the stampings in bonded relation with each other.

Another object of the invention is to provide a tubular boss or pilot in the companion flange supporting plate and to construct the end portions of the conduit or body of the fitting with straight cylindrical walls so that the plate and flange rings may be united in intimate telescopic engagement with the conduit.

A further object of the invention is to construct a pipe fitting from an organization of fabricated metal parts united by brazing or welding to form a homogeneous structure.

A still further object of the invention is to provide a cover plate stamping having a circumferential flange thereon which is designed to envelop and seal the peripheral edges of the supporting plate and rings embodied in the companion flange assembly.

Another object of the invention is to provide a pipe fitting which is sturdy of structure, economic of manufacture and free from such surface irregularities as customarily restrict the passageway in cast and forged couplings.

Other objects and advantages more or less ancillary to the foregoing and the manner in which all the various objects are realized will appear in the following description, which considered in connection with the accompanying drawing, sets forth the preferred embodiment of the invention.

Referring to the drawing:

Fig. 1 is a side elevational view partially in section of an elbow embodying the present invention;

Fig. 2 is an end elevational view thereof;

Fig. 3 is a side elevational view partially in section of an elbow similar to that shown in Fig. 1, illustrating an alternate form of flange construction;

Fig. 4 is an enlarged sectional view of a portion of the body stampings of the elbow, the section being taken on the plane indicated by the line 4—4 in Fig. 1; and Fig. 5 is a sectional view of another modified form of flange construction, the section being shown on an enlarged scale in the interest of clarity.

Referring first to Fig. 1, the improved elbow which is chosen herein as merely illustrative of one of the forms of pipe fittings within which the present invention may be embodied, comprises, a body member or conduit 10 formed from a pair of sheet metal stampings 11 and 12 having stepped ledges 13 in the longitudinal edges thereof formed thereon by a die struck or coin press operation. The end portions of the stampings 11 and 12 are configured with straight cylindrical sections 14 for telescopic engagement by a drawn tubular boss 15 formed in a supporting plate 16 which in conjunction with the shouldered plate 17 and the fabricated rings 18 form a lamellar companion flange 19 of requisite thickness. The outer face 20 of the plate 16 is preferably machined to provide a gasket supporting shoulder 21, the rings 18 and plates 16 and 17 being pierced during fabrication to provide openings 22 for the reception of the bolts. The central opening in the shouldered plate 17 and the tubular boss 15 are formed for press fit engagement, the rings 18 and the periphery of the pilot bearing on the plate 17 being likewise formed for press fit engagement with each other.

As illustrated in Fig. 4, the inner corner of the ledge 13 in the stampings 11 is formed with a grove 23 for the reception of a copper, silver or similar wire 24 employed to effect the bonded relation of the parts in the brazing operation of the assembly. Obviously various modifications of structure may be employed in forming the recess for the wire without departing from the scope or spirit of the invention. For example, opposed seats may be pressed in the vertical wall defining the stepped ledges or the corners of one or both of the extended wall portions of the stampings may be chamfered to form a recess or voids between the assembled parts. The members of the lamellar flange 19 may likewise be provided with chamfered edge portions or rounded corner sections such as the shoulder 25 defining the recess 26 in the structure illustrated in Fig. 3.

As further shown in Fig. 3, the cover plate stamping 27 is formed with a drawn neck or pilot bearing 28 adapted for intimate engagement with the tubular boss 15 on the plate 16. The cover plate is further formed with a drawn flange or cup 29 adapted to envelop the peripheral edge of the plate 16 and rings 18, and designed for press fit engagement therewith. In this embodiment as in the former case the conduit plates and rings are united in bonded relation with each other by the copper or other fusible wire rings 24 employed in the brazing operation.

From the foregoing it will be recognized that the body of the conduit 12, the rings and the plates may be readily blanked and formed from sheet metal stock, that the heterogeneous parts of the fitting when pressed together will form a self sustained assembly and that such assembly including the brazing wires may be formed into a homogeneous structure when subjected to the customary heat treatment in a hydrogen brazing furnace. In structures in which distortion occurs during brazing the outer face of the plates 16 may be machined after the parts are bonded, the gasket shoulder 21 being formed in such cases during the turning or facing operation of the flange.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A pressed sheet metal pipe fitting comprising a plurality of stampings configured to form a conduit member, ledges in the longitudinal edges thereof arranged for interengaged relation with each other, a plate, a boss thereon having an opening therein for the reception of the assembled conduit stampings, a plurality of sheet metal rings mounted on said boss constituting in combination with said plate a pipe fitting companion flange, said conduit stampings, plate and rings being bonded to form a homogeneous structure.

2. A pressed sheet metal pipe fitting comprising a pair of semi-cylindrical stampings configured to form a conduit member, ledges in the longitudinal edges thereof arranged for overlapped interengaged relation with each other, one of the ledges in each stamping having a groove in the inner corner thereof for the reception of a brazing wire, a companion flange having an opening therein for the reception of the assembled conduit stampings, said stampings and companion flange being brazed to form a unitary structure.

3. A pressed steel pipe fitting comprising a pair of stampings configured to form a conduit, ledges in the longitudinal edges thereof arranged for shouldered engagement with each other, a fabricated plate, a tubular boss thereon having an opening therein supporting the assembled stampings, a plurality of fabricated rings mounted on said boss, said stampings being bonded together and bonded with said plate and said rings to form a homogeneous unit.

4. A pressed metal pipe fitting comprising a plurality of stampings, ledges in the longitudinal edges thereof, said stampings being assembled with said ledges in nested relation, a plate, a tubular boss therein telescopically engaged with the assembled stampings, a plurality of rings circumambient said boss, a second plate superposed on said rings, a cupped circumferential flange on said second plate enveloping the outer edges of said rings, said stampings, plates and rings being bonded to form a unitary structure.

5. A pressed metal pipe fitting comprising a plurality of stampings, ledges in the longitudinal edges thereof, said stampings being assembled with said ledges in nested relation, a plate, a tubular boss therein telescopically engaged with the assembled stampings, a plurality of rings circumambient said boss, a second plate superposed on said rings, a tubular boss thereon telescopically engaged with the boss on the first named plate, rings circumambient the boss on the second named plate, an inturned flange on the second named plate telescopically engaged with the circumferential edges of said rings, said stampings being bonded together and bonded with said first named plate, said rings being bonded together and with the first and second named plates.

6. A pressed steel elbow comprising a pair of stampings, constituting a conduit, shouldered ledges in the longitudinal edges thereof disposed in interengaged relation, a plate, a tubular boss thereon, a plurality of rings mounted on said boss, said plate and rings constituting a companion flange, the parts embodied in the conduit and flange being brazed together to form an integral structure.

7. A fabricated sheet steel elbow comprising a pair of stampings of semi-cylindrical form, offset ledges in the longitudinal edges thereof interengaged in overlapped relation with each other and brazed together throughout their length, and lamellar flanges on the ends thereof, the elements of said flanges being mounted in telescopic relation with the assembled stampings and being brazed together and with said stampings.

CHESTER A. LAPP.